(12) United States Patent
Park et al.

(10) Patent No.: US 12,528,887 B2
(45) Date of Patent: Jan. 20, 2026

(54) EQUIPMENT FOR PREPARING POLYOLEFIN ELASTOMER

(71) Applicant: HANWHA TOTALENERGIES PETROCHEMICAL CO., LTD., Chungcheongnam-do (KR)

(72) Inventors: Chan Ho Park, Chungcheongnam-do (KR); Jong Joo Ha, Chungcheongnam-do (KR); Min Su Ko, Chungcheongnam-do (KR); Sang Joon Oh, Chungcheongnam-do (KR)

(73) Assignee: HANWHA TOTALENERGIES PETROCHEMICAL CO., LTD., Chungcheongnam-do (KR)

( * ) Notice: Subject to any disclaimer, the term of this patent is extended or adjusted under 35 U.S.C. 154(b) by 478 days.

(21) Appl. No.: 18/031,686

(22) PCT Filed: Jul. 26, 2021

(86) PCT No.: PCT/KR2021/009672
§ 371 (c)(1),
(2) Date: Apr. 13, 2023

(87) PCT Pub. No.: WO2022/080635
PCT Pub. Date: Apr. 21, 2022

(65) Prior Publication Data
US 2023/0383019 A1 Nov. 30, 2023

(30) Foreign Application Priority Data

Oct. 13, 2020 (KR) .................. 10-2020-0132190

(51) Int. Cl.
*C08F 2/01* (2006.01)
*C08F 6/00* (2006.01)
*C08F 210/16* (2006.01)

(52) U.S. Cl.
CPC ............... *C08F 2/01* (2013.01); *C08F 6/003* (2013.01); *C08F 210/16* (2013.01)

(58) Field of Classification Search
CPC .................... C08F 210/16; C08F 6/008
(Continued)

(56) References Cited

U.S. PATENT DOCUMENTS 3,476,736 A * 11/1969 Roy .................. B29C 48/76
159/DIG. 10
6,358,372 B1 3/2002 Zum Mallen
(Continued)

FOREIGN PATENT DOCUMENTS

CN 1440426 A 9/2003
CN 102245683 A 11/2011
(Continued)

OTHER PUBLICATIONS

Office Action issued on Apr. 2, 2024, in Japanese Patent Application No. 2023-521652 and machine translation.
(Continued)

Primary Examiner — Fred M Teskin
(74) Attorney, Agent, or Firm — Meunier Carlin & Curfman LLC

(57) ABSTRACT

The present invention relates to equipment for preparing a polyolefin elastomer including a reactor to which a solvent and a raw material are supplied, a primary devolatilizer which devolatilizes a product discharged from the reactor to remove an unreacted material (primary devolatilization recovery flow), and to discharge the remainder thereof (primary devolatilization preparation flow), a secondary devolatilizer which re-devolatilizes the primary devolatilization preparation flow discharged from the primary devolatilizer to further remove an unreacted material (secondary devolatilization recovery flow), and to discharge the
(Continued)

remainder thereof (secondary devolatilization preparation flow), a finisher which scrubs, using water, the secondary devolatilization preparation flow discharged from the secondary devolatilizer, so that the unreacted material and the water are evaporated and a polymer product remains, and a flash drum which removes low-molecular materials (impurity removal flow) from the primary devolatilization recovery flow removed from the primary devolatilizer, and recovers the remainder to the reactor.

12 Claims, 2 Drawing Sheets

(58) Field of Classification Search
USPC .................................................. 528/499, 501
See application file for complete search history.

(56) References Cited

U.S. PATENT DOCUMENTS

| 2011/0263807 | A1 | 10/2011 | Spataro et al. |
| 2020/0070121 | A1 | 3/2020 | Uhm et al. |
| 2020/0277413 | A1 | 9/2020 | Al-Haj Ali et al. |

FOREIGN PATENT DOCUMENTS

| CN | 111295397 | A | 6/2020 |
| EP | 4223788 | A1 | 8/2023 |
| JP | 2011137073 | A | 7/2011 |
| JP | 2013515107 | A | 5/2013 |
| JP | 2017503891 | A | 2/2017 |
| JP | 2017519084 | A | 7/2017 |
| JP | 2018517554 | A | 7/2018 |
| KR | 10-2017-0074658 | A | 6/2017 |
| WO | 2020123971 | A1 | 6/2020 |

OTHER PUBLICATIONS

English Translation of the International Search Report in Application No. PCT/KR2021/009672, mailed Oct. 26, 2021, 2 pages.
Search Report issued on Oct. 29, 2024, in European Patent Application No. 21880285.8.
Office Action issued on Sep. 29, 2024, in Chinese Patent Application No. 202180069210.4.

* cited by examiner

[FIG. 1]
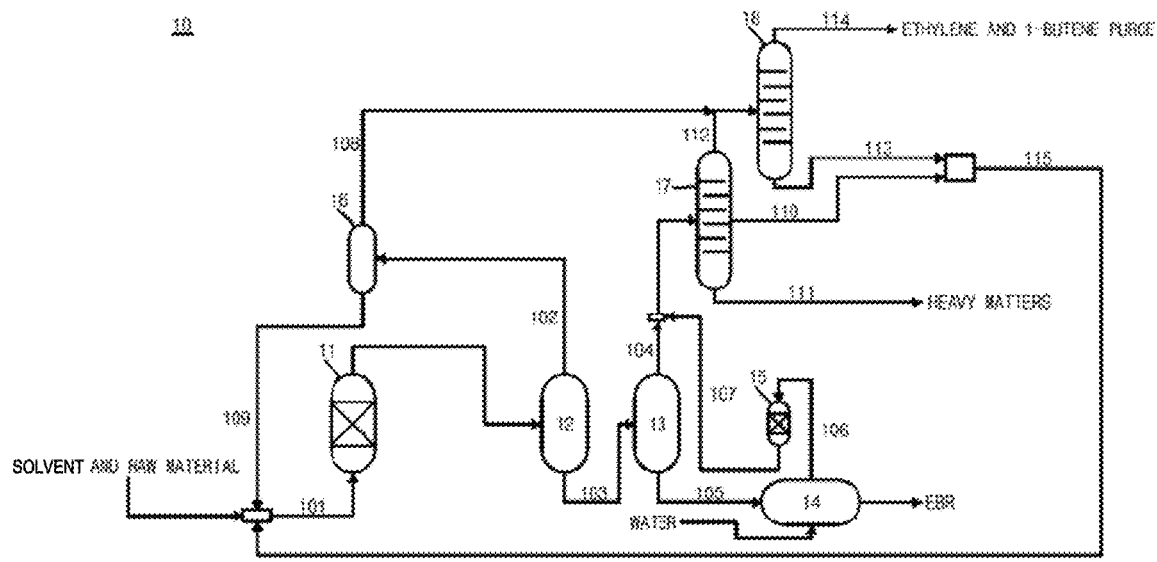
[FIG. 2]
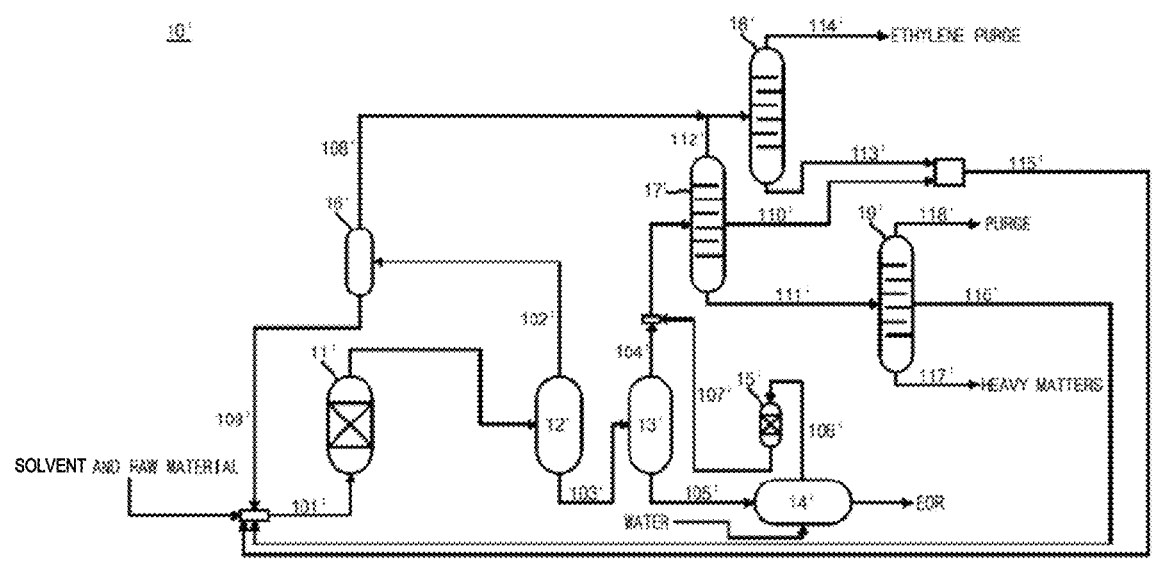

[FIG. 3]
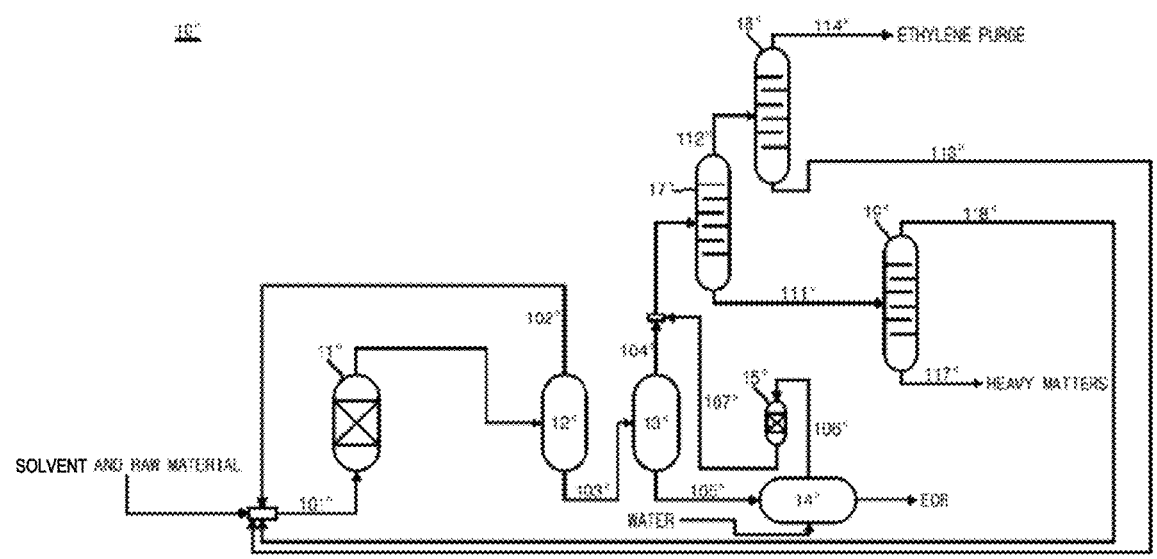

EQUIPMENT FOR PREPARING POLYOLEFIN ELASTOMER

TECHNICAL FIELD

The present invention relates to equipment for preparing a polyolefin elastomer, and more particularly, to a process for recovering a solvent and an unreacted material in the equipment for preparing a polyolefin elastomer.

BACKGROUND ART

A polyolefin elastomer (POE) is a copolymer of ethylene and alpha-olefin having a low density among polyolefin-based products, and exhibits characteristics such as differentiated impact reinforcement, high elasticity, and low heat sealing temperatures, and thus is used in automotive interior and exterior materials, sound insulation materials, footwear products, food films, encapsulation materials, and the like.

In order to prepare the POE as described above, a metallocene catalyst has been mainly used, and in addition, research has been conducted to improve the yield or efficiency of a POE preparation process by developing a Ziegler-Natta-based catalyst or by expanding factories, but there has been room for improvement in terms of the cost of raw material and process operation and the efficiency of using the raw material.

During the preparation of POEs, the separation process of a solvent and an unreacted material is mainly composed of two devolatilizers and one finisher (or extruder), and although the solvent and the unreacted material are vaporized and discharged during the process through temperature rise and pressure reduction, the largest amount of the solvent and the unreacted material are separated and discharged in a first primary devolatilizer, which has a relatively high pressure among the above, and the composition of a material such as ethylene having a relatively low boiling point is exhibited high. In addition, through stripping in which vaporized water is discharged along with a residual hydrocarbon gas, final residues are discharged together with the water from the finisher, and the residues are introduced by being included in recirculation flow as a recovery process after removing the water.

Typically, POEs have been mainly prepared from 1-octene or 1-butene, and mostly prepared by alternating two feeds. That is, it has required consideration when 1-butene is injected instead of 1-octene in a POE preparation process.

In addition, as a solvent used in the POE process as described above, high-purity n-hexane or high-purity methylcyclohexane has been used. Typically, there have been problems in that a light material having a low molecular weight, thereby having a low boiling point and a high vapor pressure, such as ethane contained in ethylene, is concentrated since the entire flow discharged from the first primary devolatilizer is recovered, a lot of energy is consumed since n-hexane is separated from an upper end of a primary distillation column in the primary distillation column, a lot of energy is consumed since 1-octene is separated from an upper end of a tertiary distillation column, and a material having a lower boiling point than 1-octene and a higher boiling point than n-hexane, which is included in a raw material as a solvent cannot be removed.

DISCLOSURE OF THE INVENTION

Technical Problem

An object of the present invention is to provide a solvent recovery unit (SRU) for solving the above-described problems occurring in a typical POE preparation process, the SRU capable of increasing the recovery rate of ethylene, which is an unreacted monomer, and 1-octene or 1-butene, which is an unreacted comonomer, and minimizing energy used in the process, while not using n-hexane of high purity of 99% or greater as a solvent, but using a mixture (hereinafter, referred to as a C6 compound, such as a mixture having an n-hexane content of 63 wt %) of materials with no double bonds among hydrocarbon compounds having 5 to 7 carbon atoms, thereby not affecting a reaction, and having a boiling point in the range of 60 to 100° C. at atmospheric pressure.

Technical Solution

Equipment for preparing a polyolefin elastomer according to the present invention may include equipment for preparing a polyolefin elastomer, wherein the equipment includes a reactor to which a solvent and a raw material are supplied, a primary devolatilizer which devolatilizes a product discharged from the reactor to remove unreacted material (primary devolatilization recovery flow), and to discharge the remainder thereof (primary devolatilization preparation flow), a secondary devolatilizer which re-devolatilizes the primary devolatilization preparation flow discharged from the primary devolatilizer to further remove an unreacted material (secondary devolatilization recovery flow), and to discharge the remainder thereof (secondary devolatilization preparation flow), a finisher which strips, using water, the secondary devolatilization preparation flow discharged from the secondary devolatilizer, so that the unreacted material and the water are evaporated and a polymer product remains, a water removal process in which the water from the unreacted material and the water removed from the finisher is removed, and the remainder (finisher reaction treatment flow) is discharged, and a primary distillation column which distills secondarily devolatilization circulation flow removed from the secondary devolatilizer and the finisher reaction treatment flow discharged from the water removal process so as to recover flow separated from a middle portion thereof to the reactor.

In addition, the middle portion of the primary distillation column 17 may be a point corresponding to 10 to 50% from an upper end of the primary distillation column 17.

In addition, the equipment may further include a flash drum which removes low-molecular materials (impurity removal flow) from the primary devolatilization recovery flow removed from the primary devolatilizer, and recovers the remainder to the reactor, and a secondary distillation column which distills the impurity removal flow removed from the flash drum and flow separated from an upper portion of the primary distillation column to recover flow separated from a lower portion thereof to the reactor.

In addition, the raw material may include a material having a boiling point lower than that of ethylene and the solvent.

In addition, the raw material may include 1-butene.

In addition, the flow separated from the upper portion of the primary distillation column may be maintained to have a mass flow rate of at most 9 times the mass flow rate of the flow separated from the middle portion of the primary distillation column.

In addition, the flow separated from the upper portion of the primary distillation column may be maintained at 35 to 140° C. and at 2 to 10 bar.

In addition, the equipment may further include a tertiary distillation column which distills flow separated from a lower portion of the primary distillation column to recover flow separated from a middle portion thereof to the reactor.

In addition, the middle portion of the tertiary distillation column may be a point corresponding to 30 to 70% from an upper end of the tertiary distillation column.

In addition, the raw material may include a material having a boiling point higher than that of ethylene and the solvent.

In addition, the raw material may include 1-octene.

In addition, the solvent may include a mixture containing a material having no double bonds among hydrocarbon compounds having 5 to 7 carbon atoms and having a boiling point of 60 to 100° C. at atmospheric pressure.

Advantageous Effects

As described above, a process for recovering a solvent and an unreacted material in equipment for preparing a polyolefin elastomer according to the present invention is to improve a method for recovering a solvent and an unreacted material in a typical POE process, wherein
(1) when recovering an unreacted material discharged from a primary devolatilizer, a step of removing a material having a high vapor pressure and a low boiling point is added, so that the concentration of materials may be prevented,
(2) C6 compounds are separated from a middle portion of a primary distillation column, so that energy consumption of the entire POE process may be reduced, and
(3) both impurities having a lower boiling point than 1-octene and impurities having a higher boiling point than the same may be removed from recirculation flow through a tertiary distillation column, which is a distillation column for 1-octene.

BRIEF DESCRIPTION OF THE DRAWINGS

FIG. 1 is a schematic diagram of a polyolefin elastomer preparation equipment according to an embodiment of the present invention.

FIG. 2 is a schematic diagram of a polyolefin elastomer preparation equipment according to another embodiment of the present invention.

FIG. 3 is a schematic diagram of a polyolefin elastomer preparation equipment according to Comparative Example of the present invention.

BEST MODE FOR CARRYING OUT THE INVENTION

With reference to the drawings, polyolefin elastomer preparation equipment 10 and 10' according to an embodiment of the present invention will be described in detail.

FIG. 1 is a schematic diagram of the polyolefin elastomer preparation equipment 10 according to an embodiment of the present invention.

The polyolefin elastomer preparation equipment 10 according to an embodiment of the present invention is for preparing ethylene-butene rubber (EBR), and includes, referring to FIG. 1, a reactor 11, a primary devolatilizer 12, a secondary devolatilizer 13, a finisher 14, a water removal process 15 including a gas-liquid separator and an adsorption column, a flash drum 16, a primary distillation column 17, and a secondary distillation column 18.

The reactor 11 receives a solvent and a raw material to produce a polymerization reactant. Here, the solvent may include a mixture containing a material with no double bonds among hydrocarbon compounds having 5 to 7 carbon atoms, thereby not affecting a reaction, and having a boiling point of 60 to 100° C. at atmospheric pressure, for example, n-hexane, and more specifically about 63 to 71.2 wt % of n-hexane, about 0.016 to 0.63 wt % of cyclohexane, about 6 to 28.7 wt % of methylcyclopentane, about 0.57 to 5.7 wt % of 2-methylpentane, about 5.4 to 22.3 wt % of 3-methylpentane, and the like. In addition, the raw material may include, for example, ethylene, and a material having a lower boiling point than the ethylene and the solvent, for example, 1-butene.

The primary devolatilizer 12 devolatilizes a product (i.e., a polymerization reactant, and a solvent, a monomer, a comonomer, or the like as an unreacted material) discharged from the reactor 11 to remove an unreacted material. Hereinafter, flow 102 removed from the primary devolatilizer 12 as the unreacted material is referred to as 'primary devolatilization circulation flow 102,' and flow 103 discharged as the remainder thereof from the primary devolatilizer 12 is referred to as 'primary devolatilization preparation flow 103.'

The secondary devolatilizer 13 re-devolatilizes the primary devolatilization preparation flow 103 discharged from the primary devolatilizer 12 to further remove an unreacted material. Hereinafter, flow 104 removed from the secondary devolatilizer 13 as the unreacted material is referred to as 'secondary devolatilization circulation flow 104,' and flow 105 discharged as the remainder thereof from the secondary devolatilizer 13 is referred to as 'secondary devolatilization preparation flow 105.' In general, the secondary devolatilization preparation stream 105 may include, for example, about 90 to wt % a polymer and other unreacted materials.

The finisher 14 strips, using water, the secondary devolatilization preparation flow 105 discharged from the secondary devolatilizer 13. As a result, unreacted materials and water in the secondary devolatilization preparation flow 105 are vaporized, and a polymer product finally remains.

The water removal process 15 removes water from flow 106 removed as the unreacted materials and the water from the finisher 14. Hereinafter, for convenience of description, flow 107 resulting therefrom is referred to as 'finisher reaction treatment flow 107.'

The reactor 11, the primary devolatilizer 12, the secondary devolatilizer 13, the finisher 14, and the water removal process 15 themselves are substantially the same as those known in the art or could be easily derived by those skilled in the art, and thus further descriptions thereof will be omitted.

The flash drum 16 removes a low molecular weight material (more specifically, containing ethane) having a relatively low boiling point and a high vapor pressure from the primary devolatilization circulation flow 102 removed from the primary devolatilizer 12. Hereinafter, flow 108 removed as a low molecular weight material containing ethane from the flash drum 16 is referred to as 'impurity removal stream 108.' Meanwhile, the flash drum 16 recovers flow 109 discharged as the remainder thereof from the flash drum 16 to the reactor 11.

The primary distillation column 17 distills the secondary devolatilization circulation flow 104 discharged from the secondary devolatilizer 13 and the finisher reaction treatment flow 107 discharged from the water removal process 15 to recover flow 110 (more specifically, containing n-hexane) separated from a middle portion thereof to the reactor 11, and to discharge flow 111 separated as heavy matters from a lower portion thereof to the outside. Here, the middle portion of the primary distillation column 17 may be, for example, a point corresponding to about 30 to 70% from an upper end thereof. In addition, flow 112 (more specifically, including a C6 compound and 1-butene) separated from an upper portion of the primary distillation column 17 may be maintained to have a mass flow rate of at least 0.1 times and at most 9 times the mass flow rate of the flow 110 separated from the middle portion of the primary distillation column 17. Preferably, the flow 112 separated from the upper portion of the primary distillation column 17 may be maintained at 35 to 140° C. and at 2 to 10 bar. Particularly preferably, the flow 112 separated from the upper portion of the primary distillation column 17 may be maintained, for example, at about 50° C. Here, when the temperature is raised to 50° C. or higher, n-hexane is separated from an upper portion, so that more energy is consumed, and when the temperature is equal to or lower than 50° C., it is necessary to use a refrigerant other than cooling water, so that there may be an increase in terms of cost, but since the essential function of the equipment is not impaired, the present invention is not infringed by changing the temperature.

The secondary distillation column 18 distills the impurity removal flow 108 removed from the flash drum 16 and the flow 112 separated from the upper portion of the primary distillation column 17 to recover flow 113 (more specifically, including a C6 compound and 1-butene) separated from a lower portion thereof to the reactor 11, and to discharge flow 114 separated as ethylene and 1-butene purge from an upper portion thereof to the outside.

In the polyolefin elastomer preparation equipment according to an embodiment of the present invention, the temperature, pressure, and flow rate for each flow may be as shown in Table 1 below (Example 1).

TABLE 1

| Flow symbols | Temperature | Pressure | Flow rate |
| --- | --- | --- | --- |
| 101 | −18.4° C. | 90 bar | 240 t/hr |
| 102 | 169° C. | 9.6 bar | 182 t/hr |
| 104 | 180° C. | 3 bar | 14.6 t/hr |
| 106 | 200° C. | 50 torr | 7.1 t/hr |
| 107 | 45° C. | 4.5 bar | 3 to 3.6 t/hr |
| 108 | 94 to 102° C. | 9.1 bar | 0.9 to 1.7 t/hr |
| 110 | 96° C. | 2.2 bar | 14.8 t/hr |
| 112 | 50° C. | 2 bar | 3 t/hr |
| 113 | 155° C. | 8.4 bar | 3.1 to 3.5 t/hr |
| 114 | 50° C. | 8 bar | 0.7 to 1.2 t/hr |
| 115 | −14.2° C. | 90 bar | 18 t/hr |

FIG. 2 is a schematic diagram of the polyolefin elastomer preparation equipment 10' according to another embodiment of the present invention.

The polyolefin elastomer preparation equipment according to another embodiment of the present invention is for preparing ethylene-octene rubber (EOR), and includes, referring to FIG. 2, a reactor 11', a primary devolatilizer 12', a secondary devolatilizer 13', a finisher 14', a water removal process 15', a flash drum 16', a primary distillation column 17', a secondary distillation column 18', and a tertiary distillation column 19'.

The reactor 11' receives a solvent and a raw material to produce a polymerization reactant. Here, the solvent may include a mixture containing a material with no double bonds among hydrocarbon compounds having 5 to 7 carbon atoms, thereby not affecting a reaction, and having a boiling point of 60 to 100° C. at atmospheric pressure, for example, n-hexane, and more specifically about 63 to 71.2 wt % of n-hexane, about 0.016 to 0.63 wt % of cyclohexane, about 6 to 28.7 wt % of methylcyclopentane, about 0.57 to 5.7 wt % of 2-methylpentane, about 5.4 to 22.3 wt % of 3-methylpentane, and the like. In addition, the raw material may include, for example, ethylene, and a material having a higher boiling point than the ethylene and the solvent, for example, 1-octene.

The primary devolatilizer 12', the secondary devolatilizer 13', the finisher 14', the water removal process 15', and the flash drum 16' are substantially the same as those of the polyolefin elastomer preparation equipment 10 according to an embodiment of the present invention, or are expected to be changed naturally by those skilled in the art in correspondence to differences in EBR/EOR characteristics, and thus repetitive descriptions thereof will be omitted.

The primary distillation column 17' distills secondary devolatilization circulation flow 104' discharged from the secondary devolatilizer 13' and finisher reaction treatment flow 107' discharged from the water removal process 15' to recover flow 110' (more specifically, containing hexane) separated from a middle portion thereof to the reactor 11'. Here, the middle portion of the primary distillation column 17' may be, for example, a point corresponding to about 10 to 50% from an upper end thereof. In addition, flow 112' separated from an upper portion of the primary distillation column 17' may be maintained to have a mass flow rate of at least 0.1 times and at most 9 times the mass flow rate of the flow 110' separated from the middle portion of the primary distillation column 17'. Preferably, the flow 112' separated from the upper portion of the primary distillation column 17' may be maintained at 35 to 80° C. and at 5 to 10 bar. Particularly preferably, the flow 112' separated from the upper portion of the primary distillation column 17' may be maintained, for example, at about 50° C. Here, when the temperature is raised to 50° C. or higher, n-hexane is separated from an upper portion, so that more energy is consumed, and when the temperature is equal to or lower than 50° C., it is necessary to use a refrigerant other than cooling water, so that there may be an increase in terms of cost, but since the essential function of the equipment is not impaired, the present invention is not infringed by changing the temperature.

The secondary distillation column 18' distills impurity removal flow 108' removed from the flash drum 16' and the flow 112' separated from the upper portion of the primary distillation column 17' to recover flow 113' (more specifically, containing a C6 compound) separated from a lower portion thereof to the reactor 11', and to discharge flow 114' separated as ethylene purge from an upper portion thereof to the outside.

The tertiary distillation column 19' distills flow 111' separated from the lower part of the primary distillation column 17' to recover flow 116' (more specifically, containing 1-octene) separated from a middle portion thereof to the reactor 11', and to discharge flow 117' separated as heavy matters from a lower portion thereof and flow 118' separated as purge from an upper portion thereof to the outside. Here, the middle portion of the tertiary distillation column 19' may be, for example, a point corresponding to about 30 to 70% from an upper end thereof.

In the polyolefin elastomer preparation equipment 10' according to another embodiment of the present invention, the temperature, pressure, and flow rate for each flow may be as shown in Table 2 below (Example 2).

TABLE 2

| Flow symbols | Temperature | Pressure | Flow rate |
|---|---|---|---|
| 101 | −18.5° C. | 90 bar | 240 t/hr |
| 102 | 180° C. | 9.6 bar | 182 t/hr |
| 104 | 200° C. | 3 bar | 13.6 to 14.3 t/hr |
| 106 | 200° C. | 50 torr | 7 to 7.6 t/hr |
| 107 | 45° C. | 4.5 bar | 3 to 3.6 t/hr |
| 108 | 50 to 70° C. | 9.1 bar | 0.07 to 0.08 t/hr |
| 110 | 95° C. | 2.1 bar | 9.8 to 11.4 t/hr |
| 111 | 152° C. | 2.2 bar | 2.4 to 4.9 t/hr |
| 112 | 50° C. | 2 bar | 2.6 to 3.4 t/hr |
| 113 | 154° C. | 8.4 bar | 2.5 to 3.2 t/hr |
| 114 | 92 to 106° C. | 8 bar | 0.2 to 0.3 t/hr |
| 115 | −14° C. | 90 bar | 12.2 to 14.6 t/hr |
| 116 | −15° C. | 90 bar | 2.1 to 4.7 t/hr |
| 117 | 161° C. | 2.7 bar | 0.2 to 1.5 t/hr |
| 118 | 157° C. | 2.5 bar | 0.15 t/hr |

FIG. 3 is a schematic diagram of the polyolefin elastomer preparation equipment 10" according to Comparative Example of the present invention.

The polyolefin elastomer preparation equipment according to Comparative Example of the present invention is for preparing ethylene-octene rubber (EOR), and includes, referring through FIG. 3, a reactor 11", a primary devolatilizer 12", a secondary devolatilizer 13", a finisher 14", a water removal process 15", a primary distillation column 17", a secondary distillation column 18", and a tertiary distillation column 19".

The polyolefin elastomer preparation equipment 10" according to Comparative Example of the present invention differs from the polyolefin elastomer preparation equipment 10' according to another embodiment of the present invention in that the flash drum 16' is omitted, so that primary devolatilization circulation flow 102" is recovered as it is to the reactor 11".

In addition, there is a difference in that in the polyolefin elastomer preparation equipment 10' according to another embodiment of the present invention, the flow 112' separated from the upper portion of the primary distillation column 17' includes a portion of a C6 compound and the flow 116' separated from the middle portion thereof includes the remainder of the C6 compound, whereas in the polyolefin elastomer preparation equipment 10" according to Comparative Example of the present invention, flow 112" separated from an upper portion of the primary distillation column 17", in other words, flow 112" injected into the secondary distillation column 18" include the entire C6 compound. Here, the temperature for the flow 112" separated from the upper portion of the primary column 17" may be, for example, about 70 to 150° C.

Furthermore, the polyolefin elastomer preparation equipment 10" according to Comparative Example of the present invention differs in that flow 118" (more specifically, containing 1-octene) separated from an upper portion of the tertiary distillation column 19" is recovered to the reactor 11".

Other matters are substantially the same as those of the polyolefin elastomer preparation equipment 10' according to another embodiment of the present invention, or are expected to be changed naturally by those skilled in the art in correspondence to differences, and thus detailed descriptions thereof will be omitted.

In the polyolefin elastomer preparation equipment 10" according to Comparative Example of the present invention, the temperature, pressure, and flow rate for each flow may be as shown in Table 3 below (Comparative Example).

TABLE 3

| Flow symbols | Temperature | Pressure | Flow rate |
|---|---|---|---|
| 101" | −18.5° C. | 90 bar | 240 t/hr |
| 102" | 182° C. | 9.6 bar | 182 t/hr |
| 104" | 200° C. | 3 bar | 13.8 to 14.4 t/hr |
| 106" | 200° C. | 50 torr | 6.9 to 7.6 t/hr |
| 107" | 45° C. | 4.5 bar | 2.9 to 3.6 t/hr |
| 111" | 150° C. | 2.2 bar | 2.6 to 5.1 t/hr |
| 112" | 91° C. | 2 bar | 12.3 to 14.7 t/hr |
| 113" | −14° C. | 90 bar | 11.6 to 14 t/hr |
| 114" | 131° C. | 8 bar | 0.7 to 0.8 t/hr |
| 117" | 161° C. | 2.7 bar | 0.2 to 1.3 t/hr |

When the sum of the contents of a solvent (n-hexane), a monomer (ethylene) and a comonomer (1-octene) is set to be the same for Comparative Example and Example 2 above, the sum of makeup of raw materials and the sum of heat duty of distillation columns 17', 18', and 19' and 17", 18", and 19" were compared. Here, the makeup of raw materials refers to an amount raw materials excluding an amount raw materials consumed for synthesizing a polymer product from an amount of raw materials to be supplemented to the reactors 11' and 11", in addition to an amount of raw materials recovered to the reactors 11' and 11", in order to drive the corresponding process in a steady state.

TABLE 4

Comparative Example

| 1-octene (wt %) | Ethylene + 1-octene + C6s (wt %) | C2= makeup (kg/hr) | 1-C8 makeup (kg/hr) | C6s makeup (kg/hr) | Sum of heat load of distillation column (reboiler//condenser) (MMcal/hr) |
|---|---|---|---|---|---|
| 15 | 99.16 | 94 | 261 | 768 | 11.65//−12.41 |
| 24 | 99.17 | 91.5 | 650 | 702 | 11.1//−11.81 |
| 35 | 99.20 | 85 | 1425 | 685 | 10.01//−10.67 |

TABLE 5

(Example 2)

| 1-octene (wt %) | Ethylene + 1-octene + C6s (wt %) | C2= makeup (kg/hr) | 1-C8 makeup (kg/hr) | C6s makeup (kg/hr) | Sum of heat load of distillation column (reboiler//condenser) (MMcal/hr) |
|---|---|---|---|---|---|
| 15 | 99.21 | 98 | 334 | 207 | 3.47//−4.46 |
| 24 | 99.21 | 93 | 821 | 207 | 3.10//−4.02 |
| 35 | 99.20 | 86 | 1603 | 106 | 2.57//−3.43 |

Table 4 and Table 5 show the mass balance as ASPEN PLUS simulation results when 1-octene is 15 wt %, 24 wt %, and 35 wt %, respectively. At this time, the sum of the contents of a solvent, a monomer and a comonomer in the flow 101' and 101"injected into the reactors 11' and 11" was set to 92.2 wt % as a base case.

In Comparative Example, the entire amount of n-hexane is recovered through the upper portion of the first distillation column 17", whereas in Example 2, n-hexane is recovered through the middle portion of the first distillation column 17', so that it has been confirmed that it is possible to more efficiently recover the solvent and the unreacted material (This is the same for Example 1.).

In addition, in Comparative Example, 1-octene was extracted through the upper portion of the third distillation column 19", so that it was not possible to remove impurities (methylcyclohexane, etc.) having a higher boiling point than n-hexane and a lower boiling point than 1-octene, but in Example 2, 1-octene is extracted through the middle portion of the tertiary distillation column 19', so that it is possible to remove impurities having a lower boiling point than 1-octene through an upper portion of the tertiary distillation column 19'.

Furthermore, in Comparative Example, the primary devolatilization circulation flow 102" removed from the primary devolatilizer 12" was recovered as it is to the reactor 11", so that when concentrating a material having a very low boiling point, such as ethane, it was not possible to remove the material, and since n-hexane is separated through an upper end of the primary distillation column 17", more energy is consumed. In contrast, in Example 2, the concentration of the aforementioned material may be prevented by removing a material having a low boiling point when recovering an unreacted material discharged from the primary devolatilizer 12', and also, energy consumption may be reduced by separating a C6 compound through the middle portion of the primary distillation column 17' (This is also the same for Example 1). In addition, both impurities having a lower boiling point than 1-octene and impurities having a higher boiling point than the same are removed by the tertiary distillation column 19', so that process efficiency may be improved.

The polyolefin elastomer preparation processes 10 and 10' described above are only one example of polyolefin elastomer preparation processes according to various embodiments of the present invention. The technical spirit of the present invention is not limited to the above embodiments, and as described in the claims, includes all ranges that can be easily changed by those skilled in the art to which the present invention pertains.

DESCRIPTION OF SYMBOLS

- 10, 10', 10": Polyolefin elastomer preparation process
- 11, 11', 11": Reactor
- 12, 12', 12": Primary devolatilizer
- 13, 13', 13": Secondary devolatilizer
- 14, 14', 14": Finisher
- 15, 15', 15": Water removal process
- 16, 16': Flash drum
- 17, 17', 17": Primary distillation column
- 18, 18', 18": Secondary distillation column
- 19', 19": Tertiary distillation column

The invention claimed is:

1. Equipment for preparing a polyolefin elastomer, the equipment comprising:
   a reactor to which a solvent and a raw material are supplied;
   a primary devolatilizer which devolatilizes a product discharged from the reactor to remove an unreacted material (primary devolatilization recovery flow), and to discharge the remainder thereof (primary devolatilization preparation flow);
   a secondary devolatilizer which re-devolatilizes the primary devolatilization preparation flow discharged from the primary devolatilizer to further remove an unreacted material (secondary devolatilization recovery flow), and to discharge the remainder thereof (secondary devolatilization preparation flow);
   a finisher which scrubs, using water, the secondary devolatilization preparation flow discharged from the secondary devolatilizer, so that an unreacted material and the water are evaporated and a polymer product remains; and
   a water removal process in which the water from the unreacted material and the water removed from the finisher is removed, and the remainder (finisher reaction treatment flow) is discharged; and a primary distillation column which distills secondarily devolatilization circulation flow removed from the secondary devolatilizer and the finisher reaction treatment flow discharged from the water removal process so as to recover flow separated from a middle portion thereof to the reactor.

2. The equipment of claim 1, wherein the middle portion of the primary distillation column is a point corresponding to 10 to 50% from an upper end of the primary distillation column.

3. The equipment of claim 1, further comprising:
   a flash drum which removes low-molecular materials (impurity removal flow) from the primary devolatilization recovery flow removed from the primary devolatilizer, and recovers the remainder to the reactor; and
   a secondary distillation column which distills the impurity removal flow removed from the flash drum and flow separated from an upper portion of the primary distillation column to recover flow separated from a lower portion thereof to the reactor.

4. The equipment of claim 3, wherein the raw material comprises a material having a double bond or a triple bond among hydrocarbons having a boiling point lower than that of ethylene and the solvent, and thus, being capable of forming a polymer by being copolymerized with the ethylene.

5. The equipment of claim 3, wherein the raw material comprises 1-butene.

6. The equipment of claim 3, wherein the flow separated from the upper portion of the primary distillation column is maintained to have a mass flow rate of at least 0.1 times and at most 9 times the mass flow rate of the flow separated from the middle portion of the primary distillation column.

7. The equipment of claim 3, wherein the flow separated from the upper portion of the primary distillation column is maintained at 35 to 140° C. and at 2 to 10 bar.

8. The equipment of claim 3, further comprising a tertiary distillation column which distills flow separated from a lower portion of the primary distillation column to recover flow separated from an upper portion or a middle portion thereof to the reactor.

9. The equipment of claim 8, wherein the middle portion of the tertiary distillation column is a point corresponding to 30 to 70% from an upper end of the tertiary distillation column.

10. The equipment of claim 8, wherein the raw material comprises a material having a double bond or a triple bond among hydrocarbons having a boiling point higher than that of the solvent, and thus, being capable of forming a polymer by being copolymerized with ethylene.

11. The equipment of claim 8, wherein the raw material comprises 1-octene.

12. The equipment of claim 1, wherein the solvent comprises a mixture containing a material having no double bonds among hydrocarbon compounds having 5 to 7 carbon atoms and having a boiling point of 60 to 100° C. at atmospheric pressure.

* * * * *